US007519730B2

(12) United States Patent
Bailey et al.

(10) Patent No.: US 7,519,730 B2
(45) Date of Patent: Apr. 14, 2009

(54) COPYING CHAT DATA FROM A CHAT SESSION ALREADY ACTIVE

(75) Inventors: Byron Lewis Bailey, Rochester, MN (US); Robert Douglas Holt, Rochester, MN (US); William Ramon Menoyo, Madison, WI (US); Jason Allan Nikolai, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 760 days.

(21) Appl. No.: 11/083,369

(22) Filed: Mar. 17, 2005

(65) Prior Publication Data

US 2006/0212518 A1    Sep. 21, 2006

(51) Int. Cl.
*G06F 15/16* (2006.01)
*H04K 1/00* (2006.01)

(52) U.S. Cl. .............. 709/237; 713/100; 713/182; 713/375; 455/428; 455/466; 370/312; 370/389; 715/750; 715/751; 715/752; 715/753; 715/755; 709/245

(58) Field of Classification Search .......... 370/312, 370/389; 715/750, 751, 752, 753, 755, 758; 455/428, 466
See application file for complete search history.

(56) References Cited

U.S. PATENT DOCUMENTS 6,636,587 B1 * 10/2003 Nagai et al. ............ 379/88.14

| 6,788,949 | B1 | 9/2004 | Bansal |
| 6,807,565 | B1 | 10/2004 | Dodrill et al. |
| 6,983,370 | B2 * | 1/2006 | Eaton et al. ............... 713/182 |
| 7,225,226 | B2 * | 5/2007 | Fitzpatrick et al. ......... 709/205 |
| 2002/0161896 | A1 | 10/2002 | Wen et al. |
| 2004/0039780 | A1 | 2/2004 | Ho et al. |

OTHER PUBLICATIONS

Oliver Laumann et al, Screen(1), Aug. 2003, pp. 1-47.
A Guide to MIRC DCC Options, The MIRC Workshop, Tutorials, Scripts and Help Files for mIRC, http://dooyoo-uk.tripod.com/mirc/dcc.htm, Nov. 24, 2004, pp. 1-4, MIRC Workshop.
U.S. Appl. No. 10/752,917, entitled "Method and Interface for Multi-threaded Conversations in Instant Messaging", filed Jan. 7, 2004.

* cited by examiner

*Primary Examiner*—Ashok B Patel
(74) *Attorney, Agent, or Firm*—Owen J. Gamon

(57) ABSTRACT

A method, apparatus, system, and signal-bearing medium that, in an embodiment, determine whether a user at a first client has a chat session already active at a second client with a third client in response to a request for initiation of a chat session for the user at the first client. If the user does already have a chat session active, the third client is notified that the first client replaces the second client in the chat session. Then chat data from the second client is copied to the first client, and a disconnect message is sent to the second client from first client. In various embodiments, the determination may be made by sending a query to a plurality of clients connected via a network or by sending a query to a server that serves the first client, the second client, and the third client. The copied chat data, which may include messages sent between the second client and the third client, is presented at the first client. In this way, chat sessions, including chat data previously set, may be moved between clients.

3 Claims, 3 Drawing Sheets

COPYING CHAT DATA FROM A CHAT SESSION ALREADY ACTIVE

FIELD

This invention generally relates to computer systems and more specifically relates to persistence of chat data across multiple clients.

BACKGROUND

The development of the EDVAC computer system of 1948 is often cited as the beginning of the computer era. Since that time, computer systems have evolved into extremely sophisticated devices that may be found in many different settings. Computer systems typically include a combination of hardware (e.g., semiconductors, circuit boards, etc.) and software (e.g., computer programs). As advances in semiconductor processing and computer architecture push the performance of the computer hardware higher, more sophisticated computer software has evolved to take advantage of the higher performance of the hardware, resulting in computer systems today that are much more powerful than just a few years ago.

Years ago, computers were isolated devices that did not communicate with each other. But today, computers are increasingly connected via networks. One common use for these networks is instant messaging, also known as chat, in which a user at one computer communicates with a user at another computer via the network. A user who is chatting from a first computer may sometimes desire to switch to second computer, yet still maintain the same chat session with another user at a third computer. For example, a user may start a chat session at the user's office computer (the first computer), but then desire to continue the chat session from another computer (the second computer) in a conference room. Unfortunately, this move between computers necessitates starting a new chat session at the second computer, but the user at the second computer cannot see the previous chat data that occurred at the first computer. Hence, the user loses contextual information that may be helpful. This information may contain any form of data, including, but not limited to text, graphics, sound, and video.

In an attempt to address this problem, some users employ a special application at the second computer, such as a remote desktop, to log on to the first computer and access the chat session at the first computer remotely. But, this technique requires a special application and also requires the overhead of accessing the chat session at the first computer remotely instead of the simplicity of starting a new chat session at the second computer. Further, a firewall at the first or the second computer may make this technique difficult or impossible.

Thus, without a better way to move chat sessions between computers, users will continue to suffer from inconvenience and loss of chat data.

SUMMARY

A method, apparatus, system, and signal-bearing medium are provided that, in an embodiment, determine whether a user at a first client has a chat session already active at a second client with a third client in response to a request for initiation of a chat session for the user at the first client. If the user does already have a chat session active, the third client is notified that the first client replaces the second client in the chat session. Then chat data from the second client is copied to the first client, and a disconnect message is sent to the second client from first client. In various embodiments, the determination may be made by sending a query to a plurality of clients connected via a network or by sending a query to a server that serves the first client, the second client, and the third client. The copied chat data, which may include messages sent between the second client and the third client, is presented at the first client. In this way, chat sessions, including chat data previously set, may be moved between clients.

BRIEF DESCRIPTION OF THE DRAWINGS

Various embodiments of the present invention are hereinafter described in conjunction with the appended drawings.

It is to be noted, however, that the appended drawings illustrate only example embodiments of the invention, and are therefore not considered limiting of its scope, for the invention may admit to other equally effective embodiments.

DETAILED DESCRIPTION

In an embodiment, an instant message manager at a first client determines whether a user at a first client has a chat session already active at a second client with a third client in response to the user requesting initiation of a chat session at the first client. If the user does already have a chat session active, then the instant message manager at the first client copies chat data from the second client to the first client, notifies the third client that the first client replaces the second client in the chat session, and sends a disconnect message to the second client. In various embodiments, the instant message manager makes the determination by sending a query to clients connected via a network or by sending a query to a server that serves the first client, the second client, and the third client. The instant message manager presents the copied chat data at the first client. The chat data may include, e.g., messages sent between the second client and the third client. More particularly, the chat data may include text, graphics, sound, video, or any other form of data.

Figure 1:
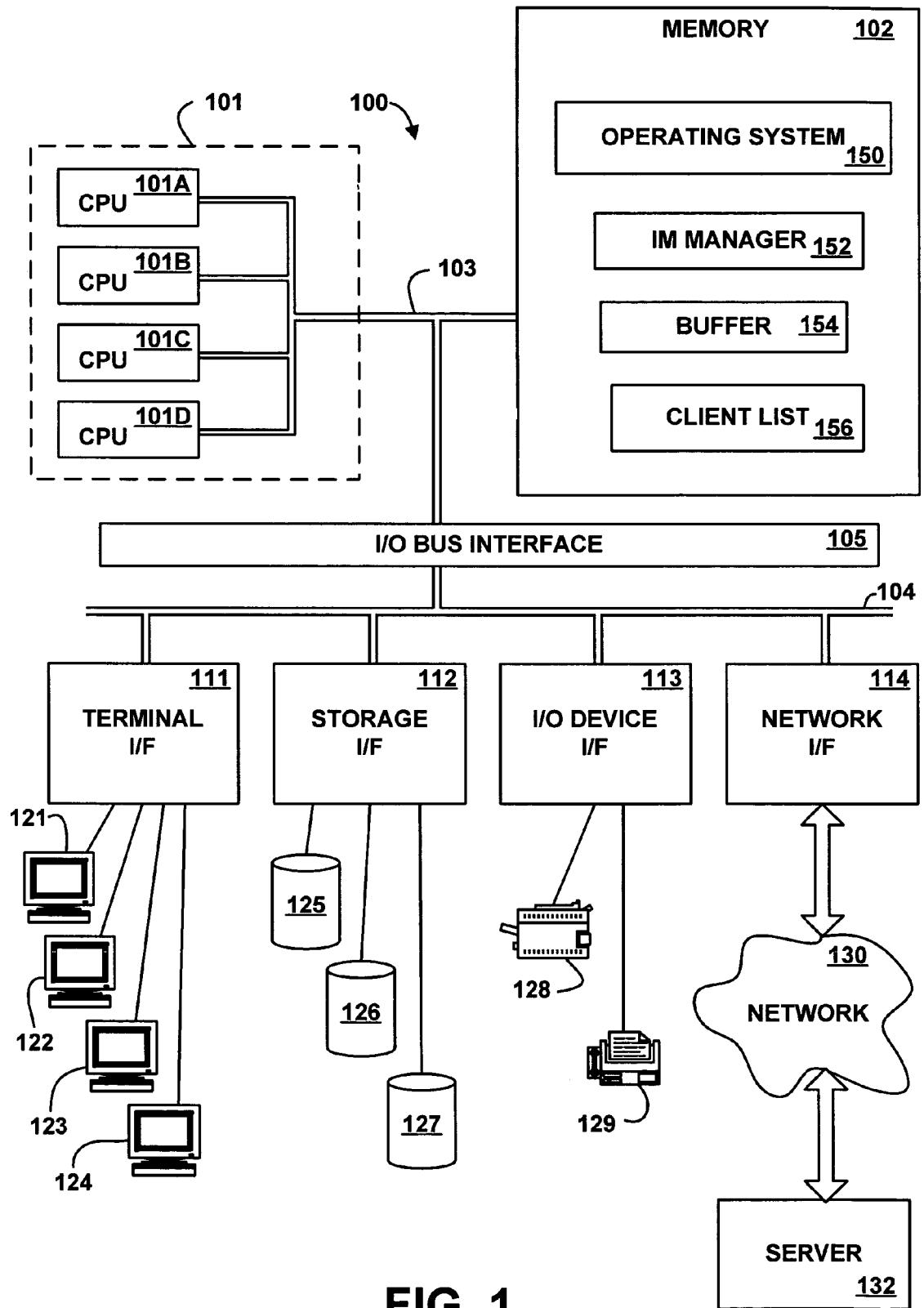
FIG. 1 depicts a high-level block diagram of an example system for implementing an embodiment of the invention.

Referring to the Drawings, wherein like numbers denote like parts throughout the several views, FIG. 1 depicts a high-level block diagram representation of a computer system 100 connected to a server 132 via a network 130, according to an embodiment of the present invention. In an embodiment, the hardware components of the computer system 100 may be implemented by an IBM eServer xSeries computer system. However, those skilled in the art will appreciate that the mechanisms and apparatus of embodiments of the present invention apply equally to any appropriate computing system.

The major components of the computer system 100 include one or more processors 101, a main memory 102, a terminal interface 111, a storage interface 112, an I/O (Input/Output) device interface 113, and communications/network interfaces 114, all of which are coupled for inter-component communication via a memory bus 103, an I/O bus 104, and an I/O bus interface unit 105.

The computer system 100 contains one or more general-purpose programmable central processing units (CPUs) 101A, 101B, 101C, and 101D, herein generically referred to as the processor 101. In an embodiment, the computer system 100 contains multiple processors typical of a relatively large system; however, in another embodiment the computer system 100 may alternatively be a single CPU system. Each processor 101 executes instructions stored in the main memory 102 and may include one or more levels of on-board cache.

The main memory 102 is a random-access semiconductor memory for storing data and programs. In another embodiment, the main memory 102 represents the entire virtual memory of the computer system 100, and may also include the virtual memory of other computer systems coupled to the computer system 100 or connected via the network 130. The main memory 102 is conceptually a single monolithic entity, but in other embodiments the main memory 102 is a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures.

The memory 102 includes an operating system 150, an instant message manager 152, a buffer 154, and a client list 156. Although the operating system 150, the instant message manager 152, the buffer 154, and the client list 156 are illustrated as being contained within the memory 102 in the computer system 100, in other embodiments some or all of them may be on different computer systems and may be accessed remotely, e.g., via the network 130. The computer system 100 may use virtual addressing mechanisms that allow the programs of the computer system 100 to behave as if they only have access to a large, single storage entity instead of access to multiple, smaller storage entities. Thus, the operating system 150, the instant message manager 152, the buffer 154, and the client list 156 are not necessarily all completely contained in the same storage device at the same time.

The operating system 150 controls the allocation and usage of hardware resources of the computer system 100 among various applications, processes, or threads, such as processing time of the processor 101, the memory 102, disk space, and peripheral devices. The operating system 150 is typically the foundation on which applications are built. In various embodiments, the operating system 150 may be implemented by OS/400, UNIX, AIX, or any other appropriate operating system.

The instant message manager 152 controls a chat session at the computer 100 or instant messages that flow between the computer 100 and one or more other devices (e.g., other clients) attached to the network 130. In various embodiments, the instant message manager 152 utilizes IRC (Internet Relay Chat), a Web browser, NetMeeting, or any other appropriate technology. Chat sessions may occur between multiple users or may be one-on-one. Chat sessions may also be open to anyone (a chat room or a chat group) or private and access controlled. As used herein, the terms "chat" and "instant messaging" are used synonymously.

In an embodiment, the instant message manager 152 includes instructions capable of executing on the processor 101 or statements capable of being interpreted by instructions executing on the processor 101 to perform the functions as further described below with reference to FIG. 3. In another embodiment, the instant message manager 152 may be implemented in microcode. In another embodiment, the instant message manager 152 may be implemented in hardware via logic gates and/or other appropriate hardware techniques.

The buffer 154 includes messages that have been previously sent and/or received during the chat session. The client list 156 includes a list of clients that the instant message manager 152 is sending and/or receiving messages to/from during the chat session.

Although the memory bus 103 is shown in FIG. 1 as a relatively simple, single bus structure providing a direct communication path among the processors 101, the main memory 102, and the I/O bus interface 105, in fact the memory bus 103 may comprise multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 105 and the I/O bus 104 are shown as single respective units, the computer system 100 may in fact contain multiple I/O bus interface units 105 and/or multiple I/O buses 104. While multiple I/O interface units are shown, which separate the system I/O bus 104 from various communications paths running to the various I/O devices, in other embodiments some or all of the I/O devices are connected directly to one or more system I/O buses.

The computer system 100 depicted in FIG. 1 has multiple attached terminals 121, 122, 123, and 124, such as might be typical of a multi-user "mainframe" computer system. Typically, in such a case the actual number of attached devices is greater than those shown in FIG. 1, although the present invention is not limited to systems of any particular size. The computer system 100 may alternatively be a single-user system, typically containing only a single user display and keyboard input, or might be a server or similar device which has little or no direct user interface, but receives requests from other computer systems (clients). In other embodiments, the computer system 100 may be implemented as a personal computer, portable computer, laptop or notebook computer, PDA (Personal Digital Assistant), tablet computer, pocket computer, telephone, pager, automobile, teleconferencing system, appliance, or any other appropriate type of electronic device.

The network 130 may be any suitable network or combination of networks and may support any appropriate protocol suitable for communication of data and/or code to/from the computer system 100. In various embodiments, the network 130 may represent a storage device or a combination of storage devices, either connected directly or indirectly to the computer system 100. In an embodiment, the network 130 may support Infiniband. In another embodiment, the network 130 may support wireless communications. In another embodiment, the network 130 may support hard-wired communications, such as a telephone line or cable. In another embodiment, the network 130 may support the Ethernet IEEE (Institute of Electrical and Electronics Engineers) 802.3x specification. In another embodiment, the network 130 may be the Internet and may support IP (Internet Protocol).

In another embodiment, the network 130 may be a local area network (LAN) or a wide area network (WAN). In another embodiment, the network 130 may be a hotspot service provider network. In another embodiment, the network 130 may be an intranet. In another embodiment, the network 130 may be a GPRS (General Packet Radio Service) network. In another embodiment, the network 130 may be a FRS (Family Radio Service) network. In another embodiment, the network 130 may be any appropriate cellular data network or cell-based radio network technology. In another embodiment, the network 130 may be an IEEE 802.11B wireless network. In still another embodiment, the network 130 may be any suitable network or combination of networks. Although one network 130 is shown, in other embodiments any number (including zero) of networks (of the same or different types) may be present.

It should be understood that FIG. 1 is intended to depict the representative major components of the computer system 100, the network 130, and the server 132 at a high level, that individual components may have greater complexity that represented in FIG. 1, that components other than or in addition to those shown in FIG. 1 may be present, and that the number, type, and configuration of such components may vary. Several particular examples of such additional complexity or additional variations are disclosed herein; it being understood that these are by way of example only and are not necessarily the only such variations.

The various software components illustrated in FIG. 1 and implementing various embodiments of the invention may be implemented in a number of manners, including using various computer software applications, routines, components, programs, objects, modules, data structures, etc., referred to hereinafter as "computer programs," or simply "programs." The computer programs typically comprise one or more instructions that are resident at various times in various memory and storage devices in the computer system 100, and that, when read and executed by one or more processors 101 in the computer system 100, cause the computer system 100 to perform the steps necessary to execute steps or elements comprising the various aspects of an embodiment of the invention.

Moreover, while embodiments of the invention have and hereinafter will be described in the context of fully-functioning computer systems, the various embodiments of the invention are capable of being distributed as a program product in a variety of forms, and the invention applies equally regardless of the particular type of signal-bearing medium used to actually carry out the distribution. The programs defining the functions of this embodiment may be delivered to the computer system 100 via a variety of signal-bearing media, which include, but are not limited to:

(1) information permanently stored on a non-rewriteable storage medium, e.g., a read-only memory device attached to or within a computer system, such as a CD-ROM, DVD-R, or DVD+R;

(2) alterable information stored on a rewriteable storage medium, e.g., a hard disk drive (e.g., the DASD 125, 126, or 127), CD-RW, DVD-RW, DVD+RW, DVD-RAM, or diskette; or (3) information conveyed by a communications medium, such as through a computer or a telephone network, e.g., the network 130, including wireless communications.

Such signal-bearing media, when carrying machine-readable instructions that direct the functions of the present invention, represent embodiments of the present invention.

Embodiments of the present invention may also be delivered as part of a service engagement with a client corporation, nonprofit organization, government entity, internal organizational structure, or the like. Aspects of these embodiments may include configuring a computer system to perform, and deploying software systems and web services that implement, some or all of the methods described herein. Aspects of these embodiments may also include analyzing the client company, creating recommendations responsive to the analysis, generating software to implement portions of the recommendations, integrating the software into existing processes and infrastructure, metering use of the methods and systems described herein, allocating expenses to users, and billing users for their use of these methods and systems. In some embodiments, the metering and billing aspects may be replaced by or supplemented with revenue generated by advertising to user of the system.

In addition, various programs described hereinafter may be identified based upon the application for which they are implemented in a specific embodiment of the invention. But, any particular program nomenclature that follows is used merely for convenience, and thus embodiments of the invention should not be limited to use solely in any specific application identified and/or implied by such nomenclature.

The exemplary environments illustrated in FIG. 1 are not intended to limit the present invention. Indeed, other alternative hardware and/or software environments may be used without departing from the scope of the invention.

Figure 2:
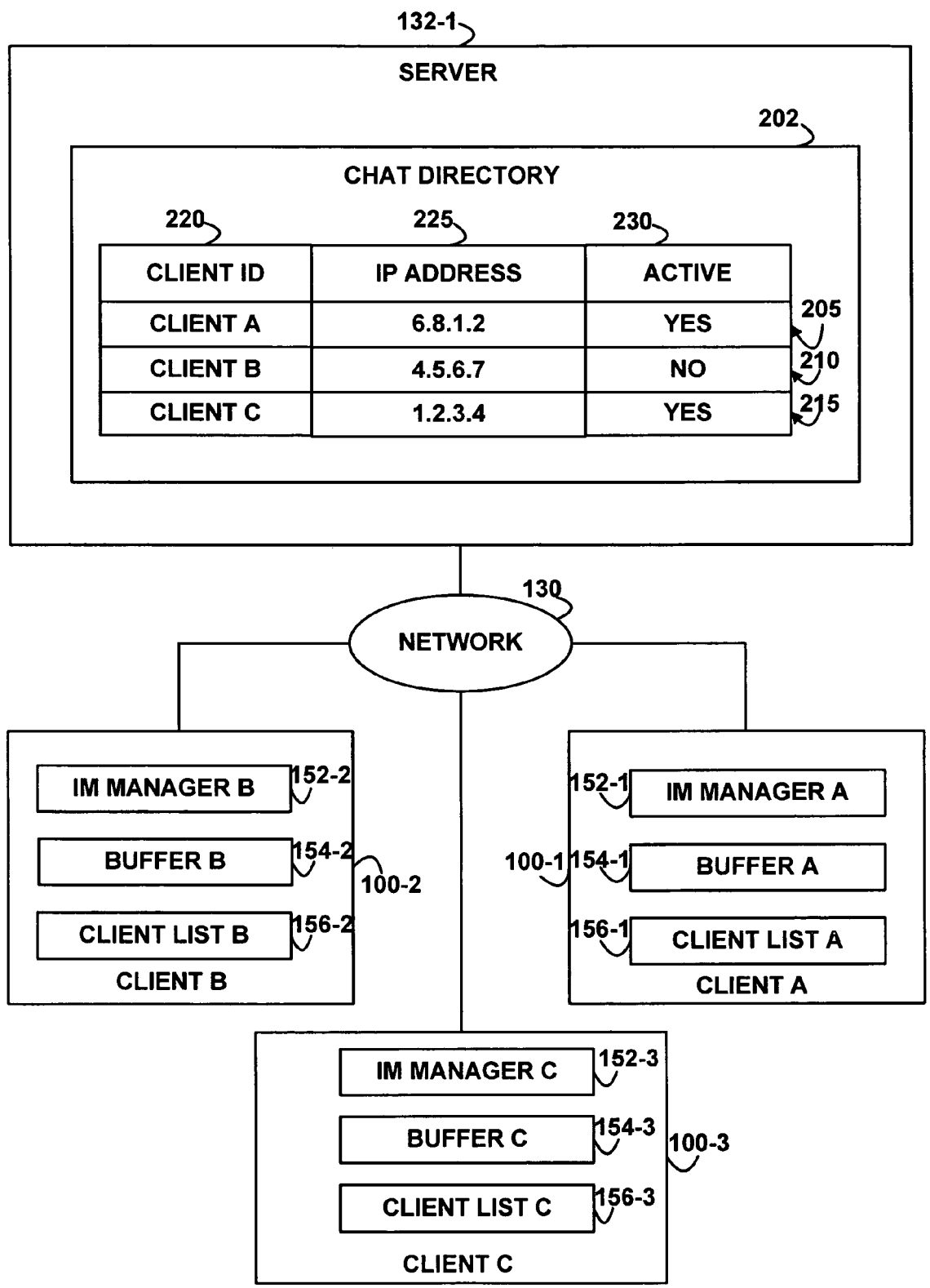
FIG. 2 depicts a block diagram of selected components of the client, the network, and the server.

FIG. 2 depicts a block diagram of selected components of the clients 100-1, 100-2, and 100-3, the network 130, and the server 132-1. The clients 100-1, 100-2, and 100-3 are all examples of the client 100 from FIG. 1. The server 132-1 is an example of the server 132 from FIG. 1.

The client 100-1 includes an instant message manager 152-1, a buffer 154-1, and a client list 156-1. The instant message manager 152-1 is an example of the instant message manager 152, as previously described above with reference to FIG. 1. The buffer 154-1 is an example of the buffer 154, as previously described above with reference to FIG. 1. The buffer 154-1 may include, for example, messages that have previously sent and/or received during a chat session. The client list 156-1 is an example of the client list 156, as previously described above with reference to FIG. 1 and may identify a client or clients with whom the client 100-1 has an active chat session.

The client 100-2 includes an instant message manager 152-2, a buffer 154-2, and a client list 156-2. The instant message manager 152-2 is an example of the instant message manager 152, as previously described above with reference to FIG. 1. The buffer 154-2 is an example of the buffer 154, as previously described above with reference to FIG. 1. The buffer 154-2 may include, for example, messages that have previously sent and/or received during a chat session. The client list 156-2 is an example of the client list 156, as previously described above with reference to FIG. 1 and may identify a client or clients with whom the client 100-2 has an active chat session.

The client 100-3 includes an instant message manager 152-3, a buffer 154-3, and a client list 156-3. The instant message manager 152-3 is an example of the instant message manager 152, as previously described above with reference to FIG. 1. The buffer 154-3 is an example of the buffer 154, as previously described above with reference to FIG. 1. The buffer 154-3 may include, for example, messages that have previously sent and/or received during a chat session. The client list 156-3 is an example of the client list 156, as previously described above with reference to FIG. 1 and may identify a client or clients with whom the client 100-3 has an active chat session.

The server 132-1 includes a chat directory 202. The chat directory 202 includes records 205, 210, and 215, but in other embodiments any number of records with any appropriate data may be present. Each of the records 205, 210, and 215 includes a client identifier field 220, an IP (Internet Protocol) address field 225, and an active field 230. The client identifier field 220 identifies the client computer associated with the respective record, such as the client 100-1 ("client A" in the record 205), the client 100-2 ("client B" in the record 210), or the client 100-3 ("client C" in the record 215). The IP address field 225 identifies the network address associated with the respective client identifier 220. Although an IP address is illustrated for IP address field 225, in other embodiments any appropriate network address or other identifier of the client 220 in the network 130 may be used. The active field 230 indicates whether a chat session is currently active at the respective clients 220. In another embodiment, the server 132-1 may also include some or all of the client list 156-1, the client list 156-2, and/or the client list 156-3.

Figure 3:
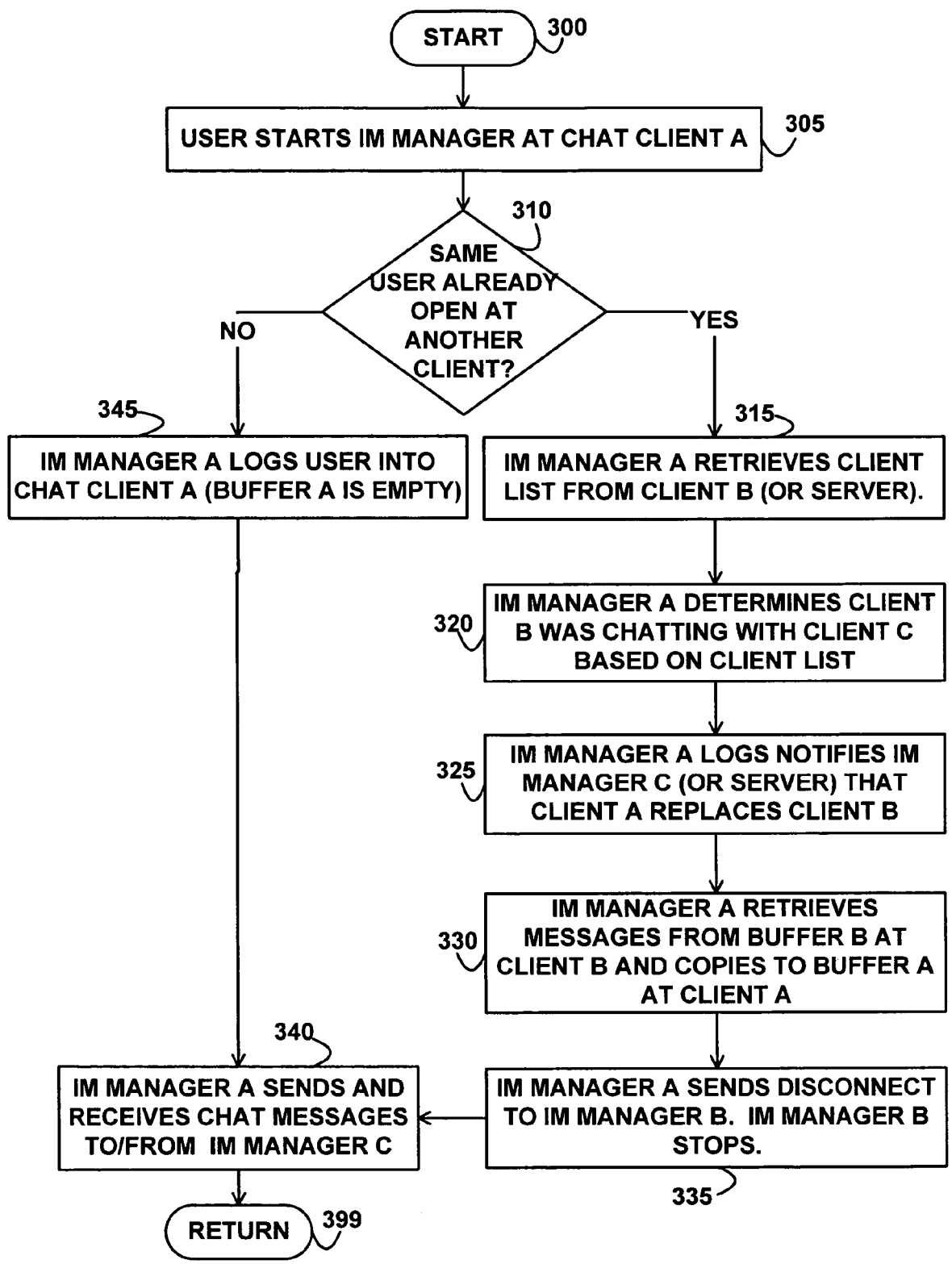
FIG. 3 depicts a flowchart of example processing for moving a chat session, according to an embodiment of the invention.

FIG. 3 depicts a flowchart of example processing for moving a chat session, according to an embodiment of the invention. Control begins at block 300. Control then continues to block 305 where the user starts the instant message manager 152-1 at the client 100-1 or otherwise requests initiation of a chat session for the user at the client 100-1. In another embodiment, the user requests the instant message manager 152-1 to change chat clients and persist chat data from a previous chat session at another client. Control then continues to block 310 where the instant manager 152-1 determines whether the user is the same user that already has another chat session open at another client. In an embodiment, the instant message manager 152-1 makes the determination at block 310 by sending queries to the various clients 100 attached via the network 130, such as the clients 100-2 and 100-3. The queries ask the instant message managers 152-2 and 152-3 whether the user who is requesting a chat session at the client 100-1 already has a chat session active at their respective clients 100-2 and 100-3. In another embodiment, the instant message manager 152-1 makes the determination at block 310 by sending a query to the server 132-1.

If the determination at block 310 is true, then the same user already has a chat session open at another client 100, so control continues to block 315 where the instant message manager 152-1 retrieves the client list 156-2 from the client 100-2 that already has a chat session open for the same user. In another embodiment, at block 315 the instant message manager 152-1 retrieves the client list 156-2 for the client 100-2 from the server 132-1. Control then continues to block 320 where the instant message manager 152-1 determines that the user at the client 100-2 was chatting with the user at client 100-3 in the previously open chat session based on the data in the retrieved client list 156-2.

Control then continues to block 325 where the instant message manager 152-1 notifies the instant message manager 152-3 at the client 100-3 that the client 100-1 replaces the client 100-2 in the chat session. In response to this notification, the instant message manager 152-3 sends/receives any further messages to/from the instant message manager 152-1 instead of the instant message manager 152-2. In another embodiment, the instant message manager 152-1 notifies the server 132-1 that the client 100-1 replaces the client 100-2.

Control then continues to block 330 where the instant message manager 152-1 retrieves messages from the buffer 154-2 and copies the retrieved messages to the buffer 154-1 at the client 100-1. In an embodiment, the messages may be copied directly from the client 100-2 to the client 100-1 without the involvement of the server 132-1. The instant message manager 152-1 further displays or otherwise presents the retrieved messages or other retrieved chat data to the user at the client 100-1.

Control then continues to block 335 where the instant message manager 152-1 sends a disconnect message to the instant message manager 152-2 or otherwise disconnects the chat session between the client 100-2 and the client 100-3. In response to the received disconnect message, the instant message manager 152-2 stops executing, either temporarily or permanently, or suspends sending and receiving instant messages. Control then continues to block 340 where the instant message manager 152-1 sends and receives chat messages to/from the instant message manager 152-3. Control then continues to block 399 where the logic of FIG. 3 returns.

If the determination of block 310 is false, then the same user does not already have a chat session open at another client attached to the network 130, so control continues from block 310 to block 345 where the instant message manager 152-1 logs the user into a chat session at the client 100-1, at which point the buffer 154-1 is empty and does not contain messages from a chat session that was previously conducted at another client 100. Control then continues to block 340, as previously described above.

In the previous detailed description of exemplary embodiments of the invention, reference was made to the accompanying drawings (where like numbers represent like elements), which form a part hereof, and in which is shown by way of illustration specific exemplary embodiments in which the invention may be practiced. These embodiments were described in sufficient detail to enable those skilled in the art to practice the invention, but other embodiments may be utilized and logical, mechanical, electrical, and other changes may be made without departing from the scope of the present invention. Different instances of the word "embodiment" as used within this specification do not necessarily refer to the same embodiment, but they may. The previous detailed description is, therefore, not to be taken in a limiting sense, and the scope of the present invention is defined only by the appended claims.

In the previous description, numerous specific details were set forth to provide a thorough understanding of embodiments of the invention. But, the invention may be practiced without these specific details. For example, some actions described with reference to FIG. 3 as being performed on the server 132 may be actually be performed by one of the clients 100. These embodiments may be desirable for embodiments that use peer-to-peer network architectures. In other instances, well-known circuits, structures, and techniques have not been shown in detail in order not to obscure the invention.

What is claimed is:

1. A method comprising:
    receiving a request for initiation of a first chat session at first client for a user;
    in response to the receiving the request, determining whether the user at the first client has the first chat session already active at a second client with a third client, wherein the determining whether the user at the first client has the first chat session already active at the second client with the third client further comprises sending a plurality of queries to a plurality of respective clients connected via a network, wherein the respective queries ask the respective clients whether the user already has the first chat session active at their respective clients;
    if the user at the first client has the first chat session already active at a second client with the third client, copying chat data from the second client to a buffer at the first client, sending a disconnect message to the second client, retrieving a client list from the second client, notifying the third client that the first client replaces the second client in the first chat session, and presenting the chat data at the first client, wherein the client list identifies the plurality of clients, identifies respective addresses of the plurality of clients, and identifies respective indications of whether respective chat sessions are active at the plurality of clients, wherein the chat data comprises messages previously sent between the second client and the third client, wherein the third client sends further messages to the first client instead of to the second client, and wherein the second client suspends the sending and receiving of instant messages in response to the disconnect message;
if the user at the first client does not have the first chat session already active at the second client with the third client, starting a new chat session at the first client, wherein the buffer is empty;
metering use of at least one of the first client and the second client; and
charging the user for the metered use.

2. A signal-bearing storage medium encoded with instructions, wherein the instructions when executed comprise:
receiving a request for initiation of a first chat session at first client for a user;
in response to the receiving the request, determining whether the user at the first client has the first chat session already active at a second client with a third client, wherein the determining whether the user at the first client has the first chat session already active at the second client with the third client further comprises sending a plurality of queries to a plurality of respective clients connected via a network, wherein the respective queries ask the respective clients whether the user already has the first chat session active at their respective clients;
if the user at the first client has the first chat session already active at a second client with the third client, copying chat data from the second client to a buffer at the first client, sending a disconnect message to the second client, retrieving a client list from the second client, notifying the third client that the first client replaces the second client in the first chat session, and presenting the chat data at the first client, wherein the client list identifies the plurality of clients, identifies respective addresses of the plurality of clients, and identifies respective indications of whether respective chat sessions axe active at the plurality of clients, wherein the chat data comprises messages previously sent between the second client and the third client, wherein the third client sends further messages to the first client instead of to the second client, and wherein the second client suspends the sending and receiving of instant messages in response to the disconnect message;
if the user at the first client does not have the first chat session already active at the second client with the third client, starting a new chat session at the first client, wherein the buffer is empty;
metering use of at least one of the first client and the second client; and
charging the user for the metered use.

3. A communications service method, comprising integrating computer-readable code into one or more computing systems, wherein the code in combination with the one or more computing systems is capable of:
receiving a request for initiation of a first chat session at first client for a user;
in response to the receiving the request, determining whether the user at the first client has the first chat session already active at a second client with a third client, wherein the determining whether the user at the first client has the first chat session already active at the second client with the third client further comprises sending a plurality of queries to a plurality of respective clients connected via a network, wherein the respective queries ask the respective clients whether the user already has the first chat session active at their respective clients;
if the user at the first client has the first chat session already active at a second client with the third client, copying chat data from the second client to a buffer at the first client, sending a disconnect message to the second client, retrieving a client list from the second client, notifying the third client that the first client replaces the second client in the first chat session, and presenting the chat data at the first client, wherein the client list identifies the plurality of clients, identifies respective addresses of the plurality of clients, and identifies respective indications of whether respective chat sessions are active at the plurality of clients, wherein the chat data comprises messages previously sent between the second client and the third client, wherein the third client sends further messages to the first client instead of to the second client, and wherein the second client suspends the sending and receiving of instant messages in response to the disconnect message;
if the user at the first client does not have the first chat session already active at the second client with the third client, starting a new chat session at the first client, wherein the buffer is empty;
metering use of at least one of the first client and the second client; and
charging the user for the metered use.

\* \* \* \* \*